United States Patent [19]

Harvey

[11] Patent Number: 5,385,210
[45] Date of Patent: Jan. 31, 1995

[54] TOW VEHICLE SYSTEM

[76] Inventor: William B. Harvey, 4232 Stafford Rd., Olney, Md. 20832

[21] Appl. No.: 189,716

[22] Filed: Feb. 1, 1994

[51] Int. Cl.$^6$ .............................................. B62D 63/02
[52] U.S. Cl. ........................................ 180/11; 180/13; 180/180
[58] Field of Search ............... 180/180, 181, 19.1, 180/19.2, 19.3, 11, 12, 13, 65.6; 280/1.5

[56] References Cited

U.S. PATENT DOCUMENTS

| | | | |
|---|---|---|---|
| 2,412,705 | 12/1946 | Jaques | 180/19.1 |
| 3,572,455 | 3/1971 | Brueske | 180/65.6 |
| 4,456,089 | 6/1984 | Kuwahara | 180/19.1 |

FOREIGN PATENT DOCUMENTS

| | | | |
|---|---|---|---|
| 2565118 | 12/1985 | France | 180/180 |
| 0677039 | 6/1939 | Germany | 180/19.1 |
| 2246751 | 2/1992 | United Kingdom | 180/180 |

Primary Examiner—Brian L. Johnson
Assistant Examiner—Victor E. Johnson
Attorney, Agent, or Firm—Morton J. Rosenberg; David I. Klein

[57] ABSTRACT

A tow vehicle system which includes a vehicle chassis, a vehicle drive mechanism and a power actuating mechanism for driving a wheel member in frictional engagement with a base surface. The tow vehicle system includes a pair of batteries which are mounted on opposing sides of a drive axle of wheel member. A motor member is mounted in vertical aligned relation with respect to drive axle to maintain a longitudinally balanced weight relation of the tow vehicle system about drive axle. In this manner, maneuverability and control of tow vehicle system is optimized.

16 Claims, 4 Drawing Sheets

TOW VEHICLE SYSTEM

BACKGROUND OF THE INVENTION

1. Field of the Invention

This invention is related to a tow vehicle system adapted to pull a wheeled user. This invention pertains to a tow vehicle system which is structured to optimize user control, maneuverability and steering of the system. In particular, this invention relates to a tow vehicle system which includes a balanced vehicle chassis upon which is mounted a pair of batteries positionally located on opposing longitudinal sides of a drive axle. Still further, this invention is directed to a tow vehicle system having a drive axle in vertically aligned relation with respect to a motor drive coupled thereto through a coupling drive member. More in particular, this invention directs itself to a balanced tow vehicle chassis which allows the user to optimize control and increases user safety during operation. Still further, this invention is related to a tow vehicle system where the structural component placement dictates a center of gravity in the vicinity of a vertical line extending upward from the drive axle to provide a balanced tow vehicle system. Additionally, this invention directs itself to a tow vehicle system where the user steering handles are coupled to a drive axle which longitudinally is in the vicinity of the tow vehicle center of gravity.

2. Prior Art

Tow vehicle systems for providing pushing or pulling displacement forces are known in the art. The best prior art known to Applicant includes U.S. Pat. Nos. 4,456,089; 3,750,777; 3,797,448; 4,109,732; 3,826,323; 4,096,919; 3,777,835; 5,025,876; 3,635,301; 3,193,038; 4,418,776; and, 5,211,254.

The best prior art known to Applicant is U.S. Pat. No. 4,456,089 which is directed to a motorized device for pushing or pulling a user mounted on roller skates. This vehicle includes a frame with a handle for grasping by the user. The user may be pulled by the motorized vehicle however, the construction of the motorized vehicle is disadvantageous when taken with respect to the subject tow vehicle system in that the wheel of this type of prior art system is mounted at one end of the overall frame with the user bearing the weight of the component drive mechanisms, This type of construction is deficient when maneuverability and control of the vehicle is of importance.

Other prior art systems such as that shown in U.S. Pat. No. 3,193,038 are directed to ski tow devices which tow a user when wearing skis. Such prior art systems depict gasoline engines mounted between plates which are secured to handle posts. However, such system constructions are not adaptable to optimized control or maneuverability provided by the subject tow vehicle system. Such prior art systems do not optimize the balancing aspects of the subject tow vehicle system for ease of maneuverability by the user. Additionally, prior art systems do not couple the steering handles to a drive axle in the vicinity of vehicle center of gravity to increase the ease of user steering.

SUMMARY OF THE INVENTION

A tow vehicle is provided for displaceably transporting a wheeled user on a base surface. The tow vehicle system includes a vehicle chassis extending in a longitudinal direction. At least one wheel member is fixedly secured to a drive axle extending in a transverse direction with respect to the longitudinal direction and is rotatably mounted to the vehicle chassis for frictionally engaging the base surface. A vehicle drive mechanism is coupled to the drive axle for rotationally displacing the wheel member. A power actuating mechanism for actuating the vehicle drive mechanism is mounted on the vehicle chassis on opposing longitudinal sides of the drive axle for substantially locating a center of gravity of the vehicle chassis in close proximity to the drive axle.

DESCRIPTION OF THE PREFERRED EMBODIMENTS

Figure 1:
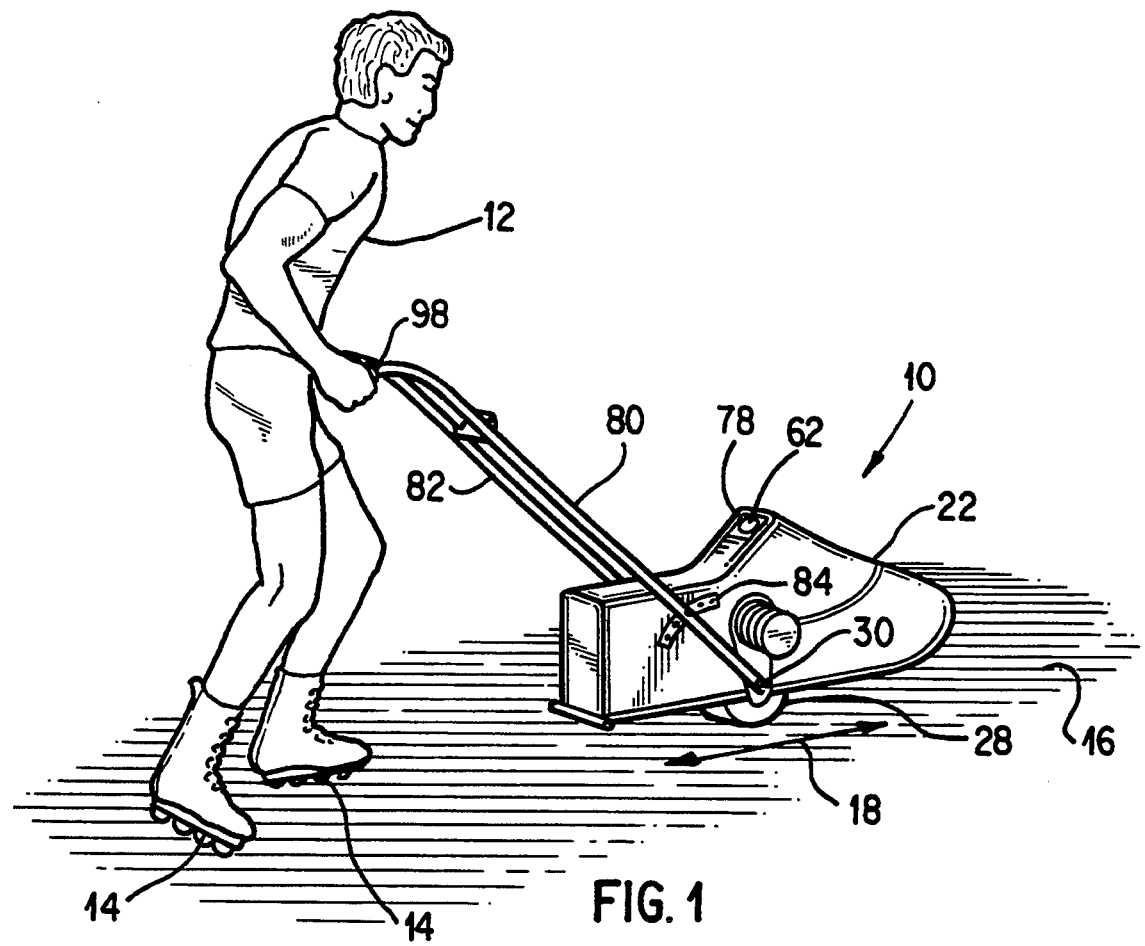
FIG. 1 is a perspective view of the tow vehicle system being operationally used by a user.
Figure 2:
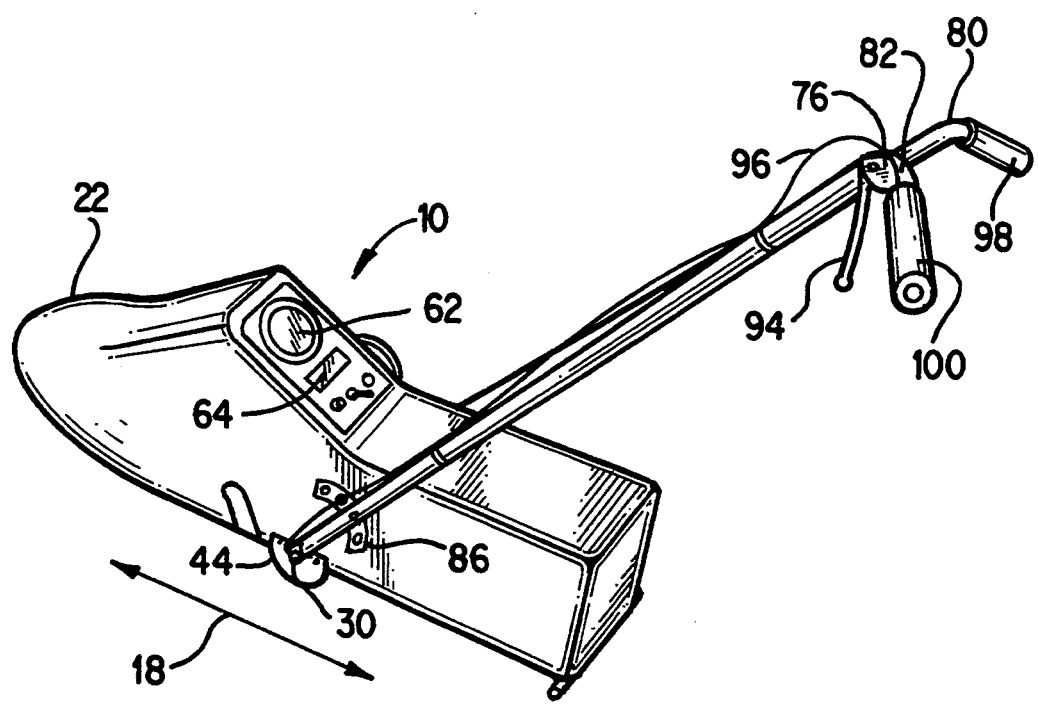
FIG. 2 is a perspective view of the tow vehicle system of the inventive concept.
Figure 3:
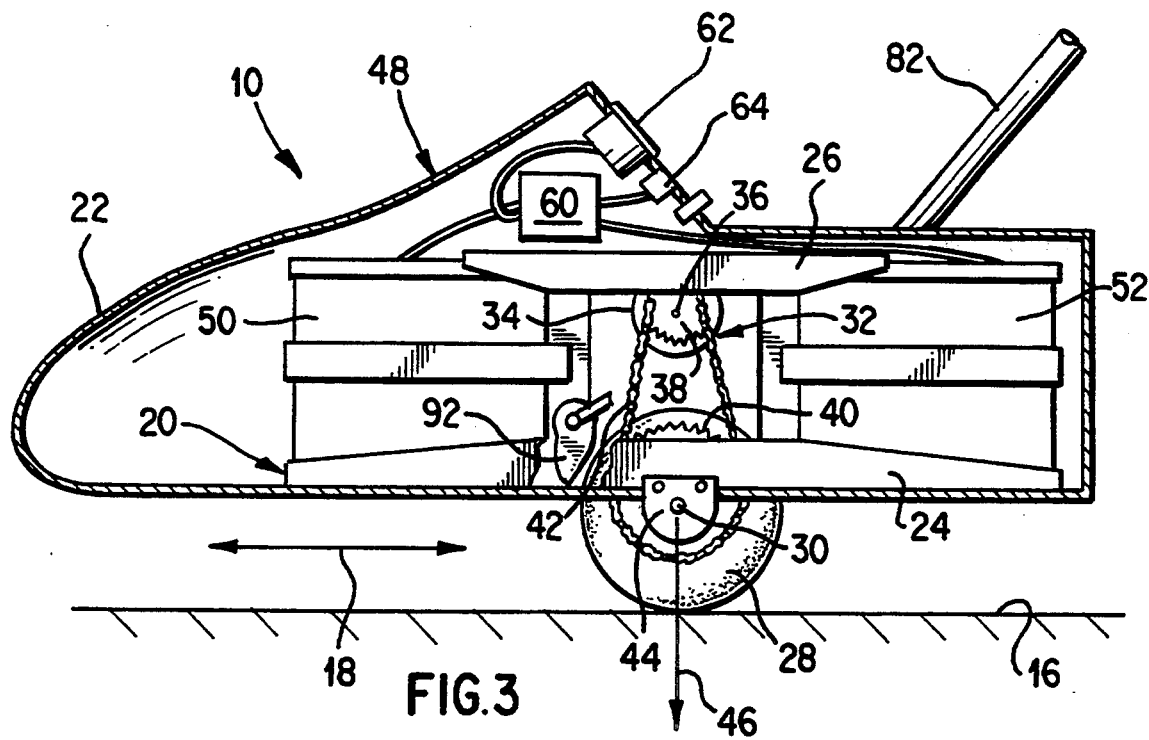
FIG. 3 is an elevational view of the tow vehicle internal structure forming the tow vehicle system.

Referring now to FIGS. 1–3, there is shown tow vehicle system 10 for displaceably transporting user 12 who is depicted as wearing roller blade shoe wear 14. It is to be understood that the shoe wear worn by user 12 in the drawings is for illustrative purposes and such may be in the form of roller blades 14, roller skates or other type of wheeled mechanisms such as skate boards which interface with the feet of user 12. The overall concept of tow vehicle system 10 is not to be construed as directed to a particular type of wheeled footwear fitted to user 12 and such is not important to the inventive concept as herein described with the exception that user 12 has rolling contact with base surface 16 for permitting tow vehicle system 10 to tow or otherwise displace user 12 across base surface 16 as shown in FIG. 1.

In general concept, tow vehicle system 10 is provided to pull or otherwise displace user 12 across base surface 16 with a maximization of the control of user 12 over maneuvers to be performed by tow vehicle system 10 for changing direction, or speed with safety. Further, the comfort of user 12 is of great importance in that tow vehicle system 10 has been developed to provide substantially a balanced center of gravity with respect to tow vehicle system 10 in order to maximize control by user 12. In particular, it is an aim of tow vehicle system 10 to locationally place the vehicle center of gravity in a vicinity of vertical direction line 46, shown in FIG. 3. The particular combination of elements and construction of tow vehicle system 10 as will be seen in following paragraphs lends itself to a vehicle which can easily be manually maneuvered by user 12 and further provides increased frictional resistance or traction between tow vehicle system 10 and base surface 16 to maximize the effect of the displacement forces applied.

Tow vehicle system 10 includes vehicle chassis 20 shown in FIG. 3 which is surrounded by aerodynamically contoured chassis cover 22 shown in FIGS. 1–3.

Vehicle chassis cover 22 is contoured both for aerodynamic contouring as well as a pleasing aesthetic effect and may be formed of plastic, Fiberglass, metal or some like material not important to the inventive concept as herein described with the exception that it be able to maintain the vehicle structural integrity throughout operational use of tow vehicle system 10.

Vehicle chassis 20 is a frame-like system which includes lower base plate 24 and upper base plate 26 as is seen in FIG. 3. Lower base plate 24 is used as a base plate member for mounting the internal components of tow vehicle system 10 as will be described in following paragraphs. Vehicle chassis 20 extends in a longitudinal direction depicted by directional arrow 18 seen in FIGS. 1-3 and is structured to be balanced about directional vertical line 46 passing through drive axle 30 and a point of contact of wheel member 28 with base surface 16.

Tow vehicle system 10 includes at least one wheel member 28 which is fixedly secured to drive axle 30 which extends in a transverse direction with respect to longitudinal direction 18. Wheel member 28 is rotationally mounted to vehicle chassis 20 for frictionally engaging base surface 16. For the embodiment shown in the Figures, one wheel member 28 is provided however, it is to be understood that a plurality of wheel members 28 may be rotationally actuated in a manner similar to wheel member 28 and additional wheel members may be rotationally mounted to vehicle chassis 20 in a transversely displaced manner with respect to the singular wheel member 28 shown in the Figures.

Tow vehicle system 10 further includes vehicle drive mechanism 32 which is coupled to drive axle 30 for rotationally displacing wheel member 28. Vehicle drive mechanism 32 includes motor 34 which has motor shaft 36 extending therefrom in a transverse direction with respect to longitudinal direction 18. Motor shaft 36 is rotationally actuated responsive to actuation of motor 34. In general, motor 34 may be a DC electric motor of standard construction, one type of which having been successfully used is a 24-volt permanent magnet DC motor that produces approximately 1,000 watts of power and is commercially available.

Motor shaft 36 is fixedly coupled to motor pinion gear 38 as shown in FIG. 3 whereby motor pinion gear 38 is rotationally displaceable responsive to the rotation of motor shaft 36. Motor pinion gear 38 is coupled to wheel gear 40 through chain drive 42 as is seen. Chain or timing belt drive 42 is an endless belt or chain which rotationally actuates wheel gear 40 responsive to rotational actuation of motor pinion gear 38. The gear tooth ratio of wheel gear 40 to gear 38 approximates 2:1 and is further assisted by standard gear reduction mechanism 44 which may bring the rotational speed direction to within an approximating range of 6-9:1 when taken with respect to motor shaft 36. However, this particular range may be adjusted for particular uses of tow vehicle system 10.

Thus, in overall concept, wheel gear or drive axle gear 40 is fixedly secured to drive axle 30 and drive axle gear 40 is further coupled to motor gear 38 for rotation of drive axle gear 40 responsive to rotational displacement of motor pinion gear 38.

Directional arrow 46 shown in FIG. 3 depicts a vertical direction and passes through an axis of drive axle 30 and a point of contact of wheel member 28 with base surface 16. Directional arrow 46 extends substantially perpendicular to longitudinal direction 18. It is of importance that motor shaft 36 has a rotational axis which is positionally located in a vertically aligned direction with respect to the rotation of drive axle 30. Further, motor 34 is mounted in vertically aligned positional relationship with respect to drive axle 30 in order to positionally locate the center of gravity of tow vehicle system 10 as close to vertical direction positional arrow 46 as possible.

Figure 5:
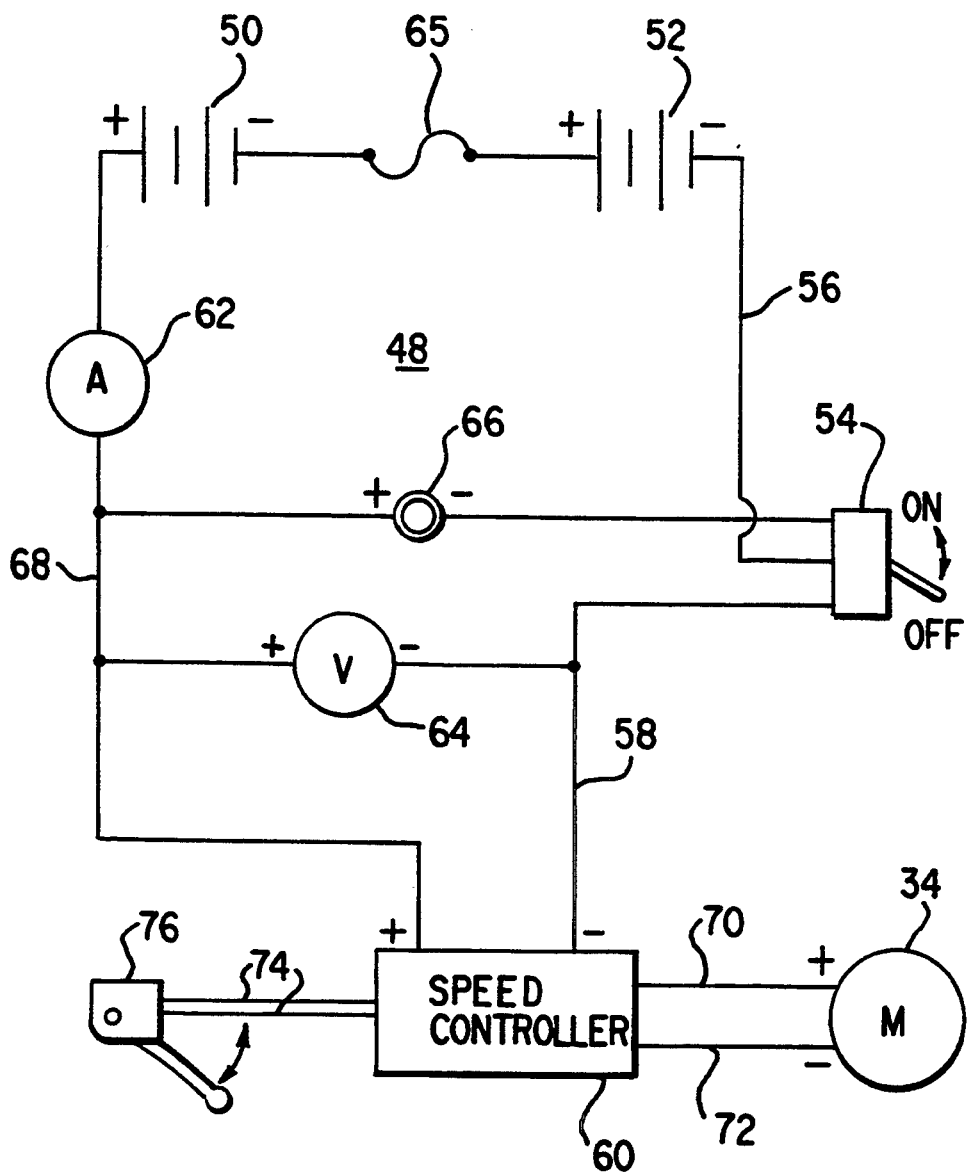
FIG. 5 is an electrical schematic diagram of the power actuating mechanism of the tow vehicle system; and, FIG. 6 is a partially cut away elevational view of a portion of the tow vehicle system showing adjustability of handle members.

Tow vehicle system 10 further includes power actuating mechanism 48 shown schematically in FIG. 5. Power actuating mechanism 48 is mounted on vehicle chassis 20 substantially on opposing longitudinal sides of drive axle 30 for substantially further locating the center of gravity of vehicle chassis 20 in close proximity to drive axle 30. Forwardly located battery 50 and rear battery 52 are mounted on lower base plate 24 of vehicle chassis 20 as is seen in FIG. 3. Forward electrical battery 50 and rear electrical battery 52 are mounted to vehicle chassis 20 on opposing longitudinal sides of drive axle 30 in order to still further maintain a center of gravity of tow vehicle system 10 as close to drive axle 30 as is possible. Forward and rear batteries 50 and 52 are electrically coupled to motor 34 as will be described in following paragraphs with reference to the electrical schematic diagram shown in FIG. 5.

As can be seen in FIG. 5, forward and rear batteries 50 and 52 are in series coupled relation through fuse 65 and are electrically coupled to on/off switch 54 which may be a single pole double series switch. As is the usual case for such systems, with switch 54 in the "on" position, motor 34 is electrically coupled to batteries 50 and 52 through lines 58 and 56 to create a closed circuit. When switch 54 is turned or positioned in the "off" position, there is an open circuit and power actuation is terminated for tow vehicle system 10.

In overall operation, when switch 54 is turned to the "off" position, such terminates current to speed controller 60 and connects charging jack 66 to batteries 50 and 52 so that a charging plug may be inserted and the batteries 50, 52 may be recharged.

Speed controller 60 is a standard speed control system having a potentiometer that either increases or decreases the overall system speed and is what is commonly known as a chopper and in particular is an on/off chopper that controls the speed of motor 34. Speed controller 60 is a standard chopper type speed controller which is used as opposed to a resistance type and is commercially available from ASTRO-FLIGHT, a Corporation having a business address in the State of California and further in particular, Model No. 205 has been successfully used as a speed controlling mechanism.

Speed controller 60 is electrically coupled to motor 34 through lines 70 and 72 as is shown, Voltmeter 64 is mounted across lines 58 and 68 and is used in combination with ammeter 62 coupled in series with battery 50 to show user 12 the general battery status through voltmeter 64 as well as the current drain during times of operation through ammeter 62. User actuation of speed controller 60 is through push-pull cables 74 mounted to throttle handle control 76 which may be a twist grip throttle shown in FIG. 2.

Figure 4:
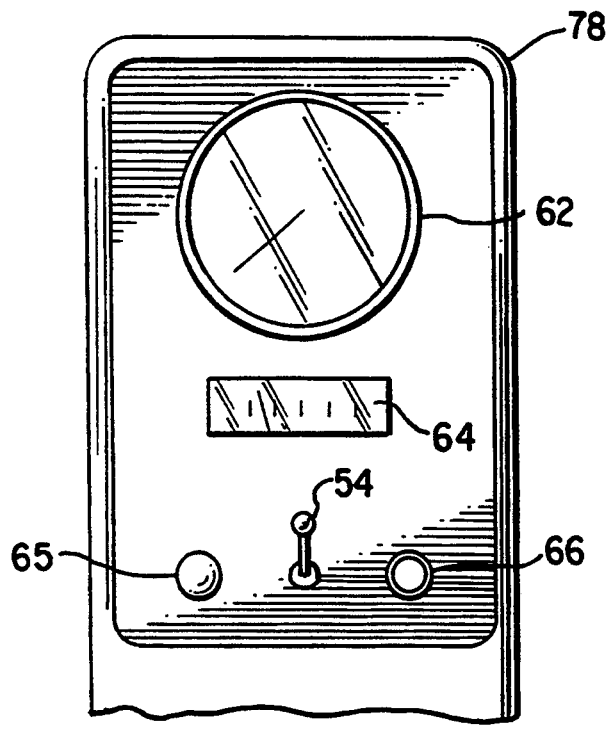
FIG. 4 is a plan view of a display panel partially cut away.

As seen in FIG. 4, there is provided display panel 78 which is mounted on chassis cover 22 and easily viewable by user 12. Display panel 78 includes viewable ammeter 62, voltmeter 64, as well as providing a mounting for fuse 60, on/off switch 54 and charging jack 66. The coupling arrangement is clearly seen in FIGS. 5 and 3 to provide user 12 with the ability of viewing critical parameters associated with the operation of tow vehicle system 10 during operation.

Figure 6:
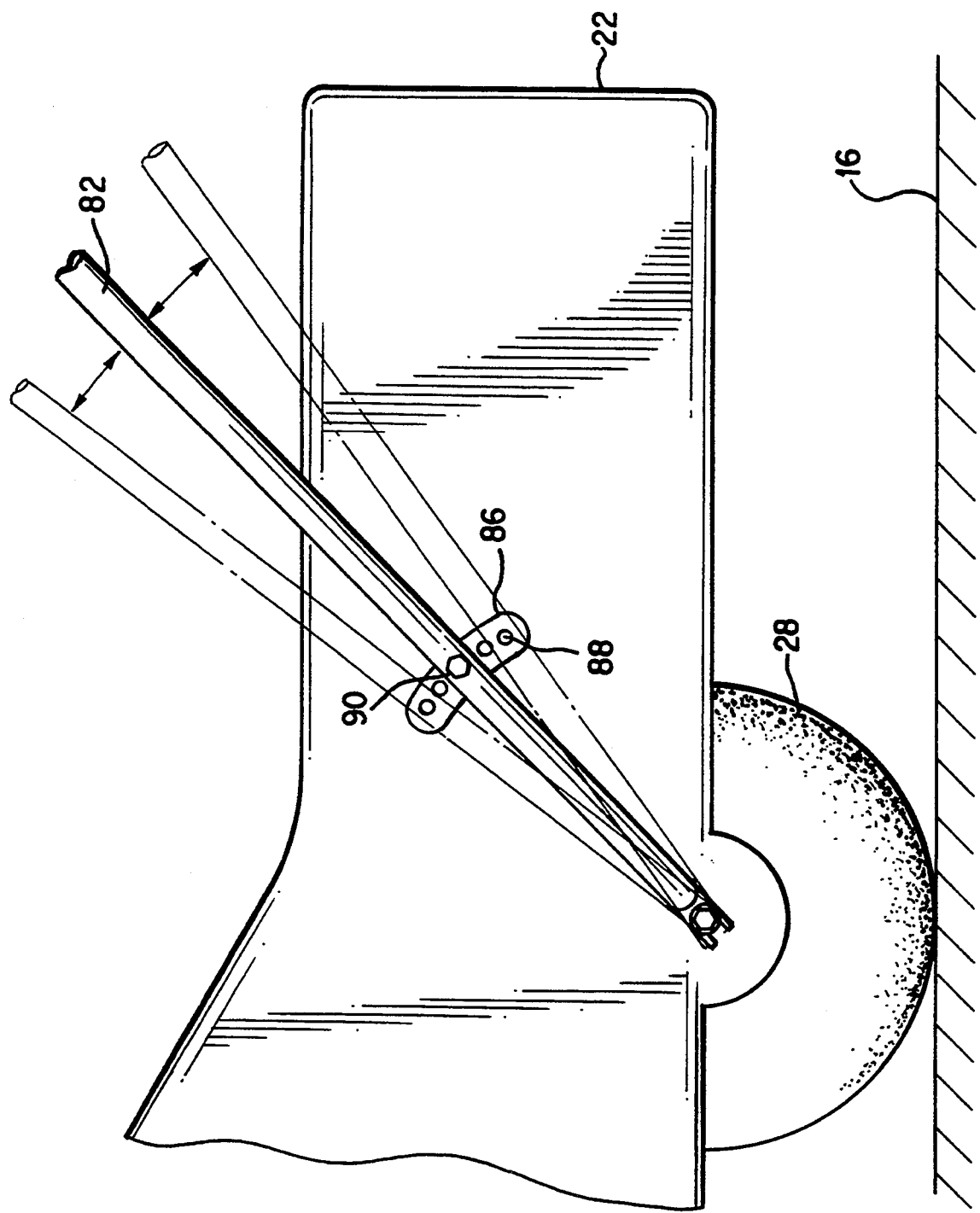

Handle members 80 and 82 shown in FIGS. 1 and 2 are extended tubular members adapted to be easily grasped by the hands of user 12. It is of importance that handle members 80 and 82 are mounted on one end to drive axle 30 which is substantially in the vicinity of the center of gravity positional location for tow vehicle system 10. The coupling of handle members 80 and 82 to drive axle 30 aids in an optimized steering geometry for user 12. In this manner, added control is provided to user 12 during a steering maneuver of vehicle system 10 and aids in the overall operational control. Handle adjusting brackets 84 and 86 are fixedly secured on opposing transverse sides of chassis cover 22 in order to allow adjustment of the angular inclination of handle members 80 and 82 at the discretion of user 12. Handle adjusting brackets 84 and 86 include a plurality of adjusting bracket openings 88 through which a pin 90 may be inserted through openings 88 for securing a particular angular adjustment as is seen in FIG. 6. In this manner, user 12 may angularly adjust handle members 80 and 82 to his or her discretion dependent upon the operational use of towing vehicle system 10.

Braking actuation may be accomplished through a variety of mechanisms however, one mechanism which has successfully been used is through use of an actuatable brake pad 92 shown in FIG. 3. Brake pad 92 may be moved into frictional engagement with wheel member 28 upon actuation of brake lever 94 shown in FIG. 2. Brake lever 94 may be coupled to brake pad 92 through push/pull wire members 96. Thus, upon actuation of brake lever 94, user 12 has within his or her control to actuate brake pad 92 into frictional engagement with wheel member 28.

One of the main considerations as has hereinbefore been described is to balance vehicle system 10 in both a fore and aft mode. Thus, vehicle system 10 is structured to maintain a balanced condition in the longitudinal direction 18 about directional arrow 46 which is the drive axle 30 positioning location. A user does not want any undue either positive or negative weight on handle sections 98 and 100. In the event there is a negative weight on handle sections 98 and 100, and user 12 lets go of system 10, the vehicle system 10 would tip forwardly. If a positive weight is found on handles 98 and 100, the user 12 must bear that weight and may suffer some discomfort after a period of operational use. Additionally, where a positive weight is found on handle sections 98 and 100 the weight that user 12 is bearing by holding the handles is in effect a weight that is not being forced downwardly upon wheel member 28. Since in most cases this is a single wheel type vehicle and a traction vehicle, the amount of weight available for frictional engagement with base surface 16 is of importance. By particular placement of the combination of elements on chassis 20, the overall tow vehicle system 10 is able to substantially neutralize the fore and aft balance of vehicle system 10 which also has an important effect on increasing the maneuverability of system 10 by user 12 as well as maximizing the traction effect.

Dependent upon particular elements used, the overall weight of tow vehicle system 10 is within the approximating range of 40–80 lbs. Thus, weight balance as to what is being felt by user 12 at handle sections 98 and 100 may be of significant consequence during long periods of operational use.

As has hereinbefore been discussed, chassis cover 22 is formed of some type of molded frame composition such as plastic or Fiberglass however, such may be rotationally molded polyethylene and further is aerodynamically contoured to provide a pleasing aesthetic effect.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A tow vehicle for displaceably transporting a wheeled user on a base surface comprising:
   (a) a vehicle chassis extending in a longitudinal direction;
   (b) wheel means fixedly secured to a drive axle extending in a transverse direction and rotatably mounted to said vehicle chassis for frictionally engaging said base surface;
   (c) handle bar means coupled to said vehicle chassis on opposing transverse sides thereof for releasably coupling said user to said vehicle chassis, said handle bar means including (1) a pair of extended handle rod members respectively pivotally mounted on said opposing transverse sides of said vehicle chassis, each of said handle rod members having a distal end pivotally coupled to a respective opposing end of said drive axle, and (2) means for positionally adjusting said pair of handle rod members with respect to said vehicle chassis; and,
   (d) power actuating means for rotatably driving said wheel means, said power actuating means being mounted on said vehicle chassis on opposing longitudinal sides of said drive axle for substantially locating a center of gravity of said vehicle chassis in close proximity to said drive axle, said power actuating means including (1) vehicle drive means coupled to said drive axle for rotationally displacing said wheel means, and (2) means for controlling a rotational speed of said vehicle drive means coupled thereto.

2. The tow vehicle as recited in claim 1 where said vehicle drive means includes motor means coupled to said means for controlling a rotational speed of said vehicle drive means and having a motor shaft coupled to said drive axle for rotationally displacing said wheel means responsive to said means for controlling a rotational speed of said vehicle drive means.

3. The tow vehicle as recited in claim 2 where said motor means includes an electric motor electrically coupled to said power actuating means.

4. The tow vehicle as recited in claim 3 where said power actuating means includes at least a pair of electrical batteries respectively mounted to said vehicle chassis on opposing longitudinal sides of said drive axle.

5. The tow vehicle as recited in claim 2 where said motor means includes gear reduction means for reducing a rotational speed of said wheel means below a rotational speed of said motor means.

6. The tow vehicle as recited in claim 5 where said motor means includes a motor gear fixedly secured to said motor shaft for rotational displacement thereof about an axis of said motor shaft, said motor gear being coupled to said drive axle.

7. The tow vehicle as recited in claim 6 where said motor means includes a drive axle gear fixedly secured to said drive axle, said drive axle gear coupled to said motor gear for rotation of said drive axle gear responsive to said rotational displacement of said motor gear.

8. The tow vehicle as recited in claim 7 where said motor gear and said drive axle gear are coupled each to the other by an endless chain matingly engaging said motor gear and said drive axle gear.

9. The tow vehicle as recited in claim 2 where said motor shaft includes a motor shaft rotational axis positionally located in vertically displaced and longitudinally aligned positional placement with respect to an axis of rotation of said drive axle.

10. The tow vehicle as recited in claim 1 where said means for positional adjustment includes a pair of arcuate adjustment brackets mounted on said opposing transverse sides of said vehicle chassis, each of said brackets having a plurality of openings formed therethrough for insert of an adjustment pin member through a respective handle rod member into one of said openings.

11. The tow vehicle as recited in claim 1 including means for braking said rotational displacement of wheel means responsive to a hand actuation of said user.

12. The tow vehicle as recited in claim 11 where said means for braking includes a brake caliper displaceably mounted on said vehicle chassis for frictionally engaging said wheel means responsive to said hand actuation of said user.

13. The tow vehicle as recited in claim 1 where said means for controlling a rotational speed of said vehicle drive means includes:
   (a) a speed control circuit electrically coupled to said vehicle drive means and said power actuating means;
   (b) a voltmeter electrically coupled in parallel relation to said speed control circuit; and,
   (c) an ammeter in electrically series coupling between said power actuation means and said speed control circuit.

14. The tow vehicle as recited in claim 13 including a display panel mounted on an upper surface of said vehicle chassis, said display panel having said voltmeter and ammeter contained therein for viewing by said user.

15. The tow vehicle as recited in claim 1 where said wheel means includes a singular wheel member for frictional engagement with said base surface.

16. The tow vehicle as recited in claim 1 where said wheel means includes a plurality of wheel members having a coincident transversely directed rotational axis.

* * * * *